(12) United States Patent
Lucas et al.

(10) Patent No.: US 10,808,430 B2
(45) Date of Patent: Oct. 20, 2020

(54) SECURITY DEVICE

(71) Applicant: RTF Europe Limited, Coventry, West Midlands (GB)

(72) Inventors: Tim John Lucas, Rugby (GB); Liam Edward Michael Cross, Coventry (GB)

(73) Assignee: RTF Europe Limited, West Midlands (GB)

( * ) Notice: Subject to any disclaimer, the term of this patent is extended or adjusted under 35 U.S.C. 154(b) by 66 days.

(21) Appl. No.: 15/553,308

(22) PCT Filed: Feb. 25, 2016

(86) PCT No.: PCT/GB2016/050472
§ 371 (c)(1),
(2) Date: Aug. 24, 2017

(87) PCT Pub. No.: WO2016/139450
PCT Pub. Date: Sep. 9, 2016

(65) Prior Publication Data
US 2018/0058107 A1    Mar. 1, 2018

(30) Foreign Application Priority Data
Mar. 2, 2015   (GB) .................................. 1503499.4

(51) Int. Cl.
*E05B 73/00*   (2006.01)
*E05B 35/00*   (2006.01)

(52) U.S. Cl.
CPC ........ *E05B 73/0082* (2013.01); *E05B 35/008* (2013.01)

(58) Field of Classification Search
CPC ........................... E05B 73/0082; E05B 35/008
See application file for complete search history.

(56) References Cited

U.S. PATENT DOCUMENTS

| 1,059,143 A | | 4/1913 | Gibbs | |
| 4,066,231 A | * | 1/1978 | Bahner | B43M 99/00 |
| | | | | 248/289.11 |
| 5,788,202 A | * | 8/1998 | Richter | B60R 11/0241 |
| | | | | 224/570 |

(Continued)

FOREIGN PATENT DOCUMENTS

| DE | 29721836 U1 | 3/1998 |
| EP | 1604868 A1 | 4/2005 |

(Continued)

OTHER PUBLICATIONS

International Search Report and Written Opinion dated Aug. 8, 2016.

(Continued)

*Primary Examiner* — Anita M King
(74) *Attorney, Agent, or Firm* — Wood, Phillips, Katz, Clark & Mortimer

(57) ABSTRACT

A security device for holding a phone, camera, tablet, smart watch or other valuable item so that it can be viewed and used by a person, without the valuable item being readily removed from the security device. The security device has at least two clamping elements to clamp an item on two sides and clamping means to draw the at least two clamping elements together to clamp the item.

10 Claims, 19 Drawing Sheets

(56) References Cited

U.S. PATENT DOCUMENTS

| | | | |
|---|---|---|---|
| 6,256,387 B1 | 7/2001 | Wang | |
| 6,285,758 B1* | 9/2001 | Lu | B60R 11/0241 |
| | | | 379/446 |
| 8,985,544 B1* | 3/2015 | Gulick, Jr. | F16M 13/00 |
| | | | 248/176.1 |
| 9,032,766 B2* | 5/2015 | Su | E05B 73/0082 |
| | | | 70/14 |
| 9,194,532 B2* | 11/2015 | Bisesti | F16M 11/04 |
| 9,936,823 B2* | 4/2018 | Galant | F16M 11/041 |
| 9,972,178 B2* | 5/2018 | Richardson | G08B 13/1454 |
| 2009/0173863 A1* | 7/2009 | Crown | B60R 11/0241 |
| | | | 248/316.4 |
| 2010/0079285 A1* | 4/2010 | Fawcett | E05B 73/0005 |
| | | | 340/568.1 |
| 2010/0108828 A1 | 5/2010 | Yu et al. | |
| 2010/0148030 A1 | 6/2010 | Lin | |
| 2012/0037783 A1* | 2/2012 | Alexander | A47F 7/024 |
| | | | 248/551 |
| 2013/0043369 A1 | 2/2013 | Wheeler | |
| 2014/0060218 A1* | 3/2014 | Bisesti | F16M 11/04 |
| | | | 73/865.8 |
| 2014/0097110 A1 | 4/2014 | Shieh | |
| 2014/0106608 A1* | 4/2014 | Howarth | F16M 13/02 |
| | | | 439/531 |
| 2015/0208826 A1* | 7/2015 | Yang | E05B 73/0082 |
| | | | 248/551 |
| 2015/0305518 A1* | 10/2015 | Galant | F16M 11/041 |
| | | | 248/551 |

FOREIGN PATENT DOCUMENTS

| | | |
|---|---|---|
| GB | 2353914 A | 3/2001 |
| TW | M471529 U | 2/2014 |
| WO | 2008009875 A1 | 1/2008 |
| WO | 2014009979 A1 | 1/2014 |
| WO | 2014019072 A1 | 2/2014 |
| WO | 2014035436 A1 | 3/2014 |
| WO | 2014078966 A1 | 5/2014 |
| WO | 2014160758 A1 | 10/2014 |
| WO | 2015026918 A1 | 2/2015 |

OTHER PUBLICATIONS

UK Examination Report dated Mar. 28, 2017.
UK Combined Search and Examination Report dated May 13, 2016.
UK Search Report and Examination Opinion dated Jun. 23, 2015.
UK Examination Report dated Nov. 21, 2017.

* cited by examiner

SECURITY DEVICE

CROSS-REFERENCE TO RELATED APPLICATIONS

This application claims priority of Appln. No. PCT/GB2016/050472, filed Feb. 25, 2016 and Great Britain Appln. No. 1503400.4, filed Mar. 2, 2015, the disclosures of which are hereby incorporated by reference in their entirety.

FIELD OF THE INVENTION

The present invention is concerned with a security device. More specifically, the present invention is concerned with a security device for holding a valuable item, for example a mobile telephone, camera, tablet, smart watch or the like, so that it can be viewed and used, for example, by a potential customer.

BACKGROUND OF THE INVENTION

Valuable items, such as mobile telephones and the like, are displayed in shops so that potential customers can view and use the item. There is a need to secure these items to prevent them being dropped and damaged or stolen from the shop.

Displaying valuable items in locked, glass-fronted display cabinets ensures that the items are protected from damage and theft; however a potential customer cannot closely view or use the item without supervision by an employee of the shop, which is not practical in a busy retail environment.

Existing security devices for securing valuable items on open displays include mounts that have adhesive pads for attachment to the item and cables to tether the item behind the display. These devices suffer the disadvantage that the adhesive pads can easily be removed and the adhesive may degrade with time.

Other security devices for such valuable items include clamps that extend from behind the mount to grip the front of the item. It is difficult to get the clamp tension right on these devices; over-tightening the clamp can result in damage to the front of the device, in particular, cracking of the screen of a mobile phone or tablet, and under-tightening the clamp renders the security device ineffective.

A further disadvantage of known security devices is that they include a number of different components, which requires the use of significant amounts of material.

Accordingly, there is a need for a security device that enables a potential customer to easily view and use a valuable item, which secures the item from thieves, is easy to use correctly and does not cause damage to the item.

BRIEF SUMMARY OF THE INVENTION

According to a first aspect of the present invention, there is provided a security device for holding a phone, camera, tablet, smart watch or other valuable item so that it can be viewed and used by a person, but not readily removed from the security device, the security device comprising at least two clamping elements to clamp an item on two sides and clamping means to draw the at least two clamping elements together to clamp the item.

By providing at least two clamping elements that are drawn together to clamp the item, the clamping forces are transmitted to the side of the item being held, thereby protecting the front surface of the item from becoming damaged by the clamp.

A further advantage is that the security device includes fewer components than known devices thereby reducing the amount of material required and reducing the environmental impact of the product.

Each of the at least two clamping elements may include a lug to overlap the front of the item.

The lugs advantageously prevent the item being removed or pulled away from the security device.

The position of each lug may be adjustable with respect to the clamping element on which it is mounted, and there may a one way mechanism, such that the lug can be moved to engage the front face of a valuable item, and cannot be moved back away from that position. The one way mechanism on each of the at least two clamping elements may include a pawl to engage a ratchet.

The adjustable positioning of each lug is advantageous for securing items of different sizes and shapes. The one way mechanism prevents unauthorised removal of the item from the security device.

The one way mechanism may be releasable in response to rotation of the clamping means. In this way, free movement of the lugs can be enabled for example so that the position of the lugs with respect to the item being held may be adjusted and/or different sizes of lugs can be accommodated according to the item being held.

Additionally or alternatively, the clamping means includes a scroll plate. The scroll plate may include means defining a spiral groove and each of the at least two clamping elements may include a connector received in the groove, such that rotational movement of the scroll plate results in linear movement of the at least two clamping elements in the radial direction with respect to the groove.

The scroll plate may include means defining a pair of spiral grooves and each of the at least two clamping elements may include a connector, each of the connectors received in one of the grooves, such that rotational movement of the scroll plate results in linear movement of the at least two clamping elements in the radial direction with respect to the pair of grooves.

The scroll plate provides a mechanism by which the security device can easily be tightened sufficiently to secure the item being held and prevents over-tightening of the security device.

Each of the at least two clamping elements may be detachably attached to the scroll plate.

Providing detachably attachable clamping elements enables different clamping elements to be fitted to the security device, depending on the item being secured. For example, clamping elements of different lengths may be used to secure different sized items.

The clamping means to draw the at least two clamping elements together to clamp the item may be operated by a tool or key to facilitate correct installation and tightening of the security device and to prevent unauthorised removal of the security device. The tool or key may be coded.

The security device may further comprise a plug for connection to a secure fixing. The plug may be a non-return push connector. Additionally or alternatively, the plug may comprise a connector pin to provide a contact to the valuable item. Preferably, the plug comprises a collar and cable to tether the security device to a secure fixing. The plug may include an electrical connector for providing electrical charge to an item being held by the security device. The plug may further comprise a circuit having an alarm, for example an audible alarm, to provide a signal if contact between the connector pin and the valuable item is broken.

According to a second aspect of the invention there is provided a tool for operating the clamping means of a security device according to the first aspect of the invention.

The tool may comprise a locating means for engagement with the security device and a key for cooperation with the clamping means to prevent unauthorised removal of the security device from a valuable item and to ensure that the security device is correctly fitted on the valuable item.

The locating means may comprise a boss or pin for engagement with an aperture in the security device. Additionally or alternatively, the key may cooperate with a socket on the clamping means.

In some embodiments, the key may be a first hex drive and the socket may be a second hex drive and the first and second hex drives may cooperate to enable rotation to operate the clamping means.

Alternatively, the key may comprise at least one pin or spigot that cooperates with one or more sockets to enable rotation to operate the clamping means.

According to a third aspect of the invention there is provided a kit of parts for assembling a security device according to the first aspect of the invention.

BRIEF DESCRIPTION OF THE DRAWINGS

Embodiments of a security device according to the invention will now be described by way of example and with reference to the accompanying drawings in which.

DETAILED DESCRIPTION OF THE INVENTION

Referring now to FIGS. 1 to 15 there is shown a security device 20 according to a first embodiment of the present invention.

Figure 1:
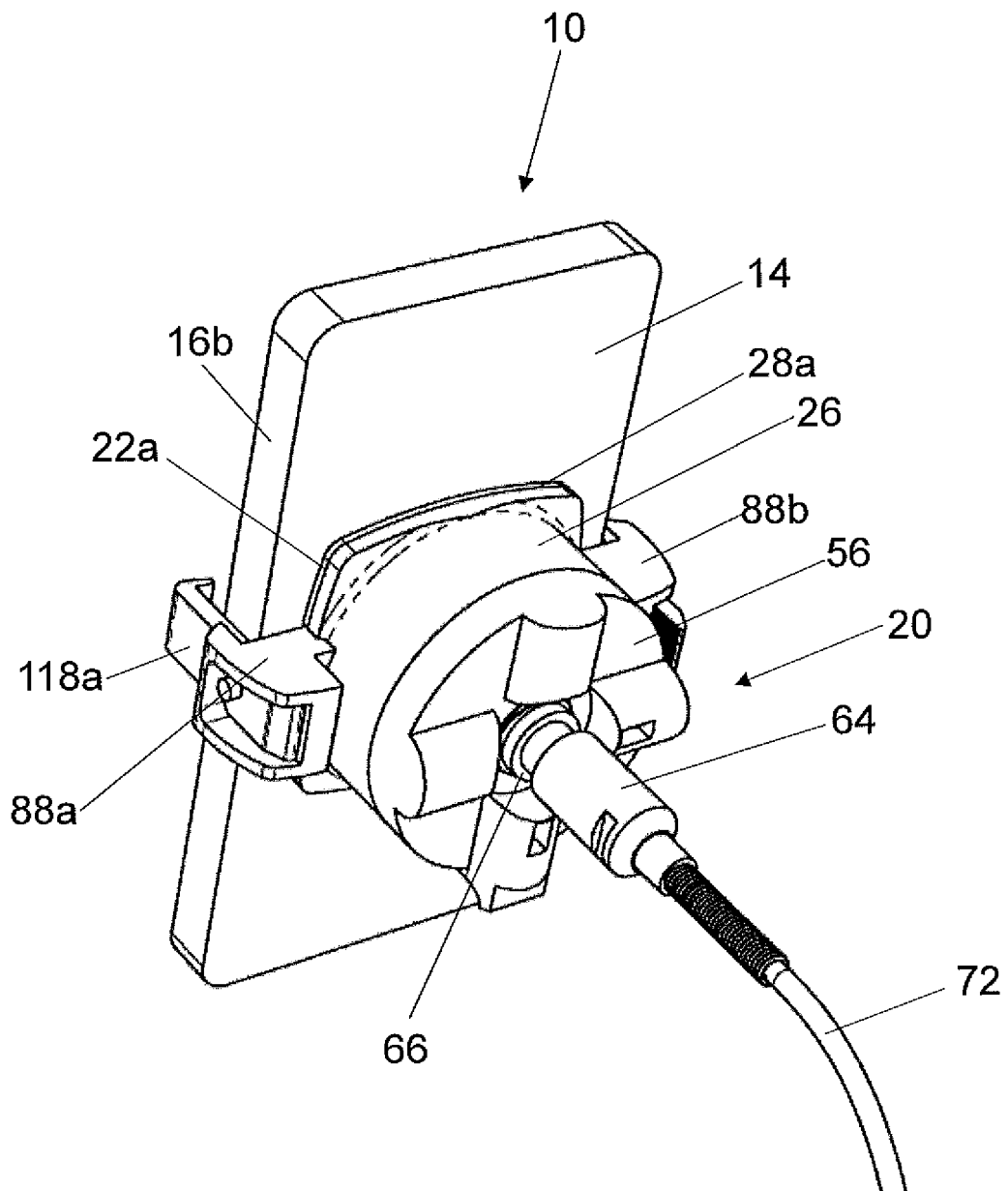
FIG. 1 is a rear perspective view of a security device in accordance with a first embodiment of the present invention, the security device shown clamping a mobile telephone.
Figure 2:
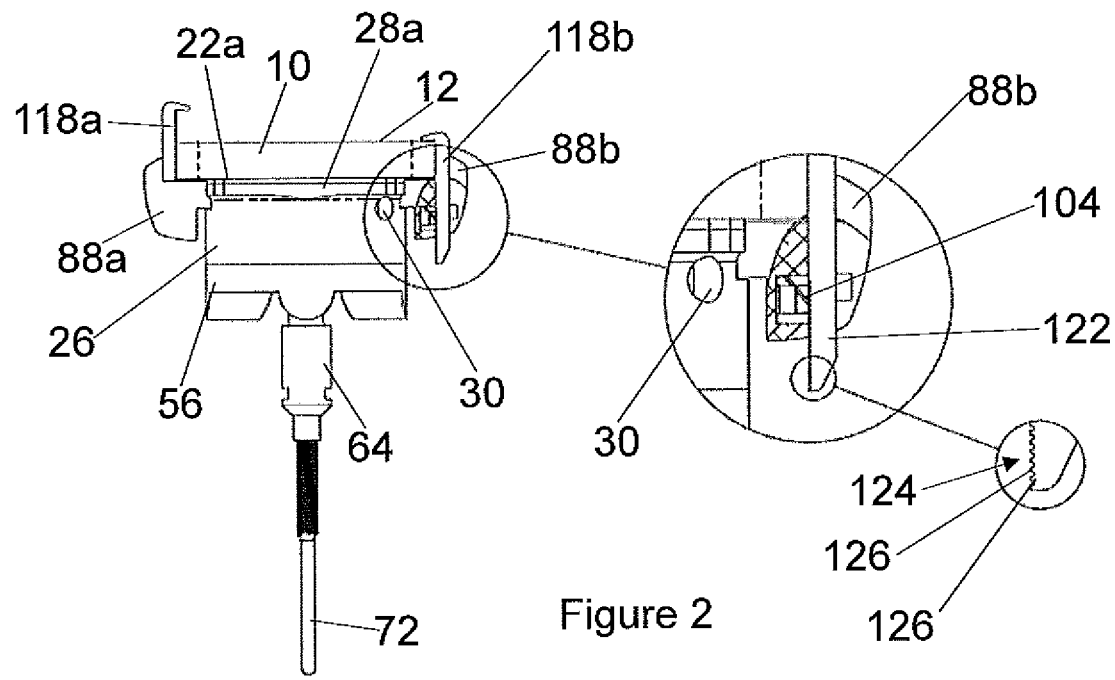
FIG. 2 is a plan view of the security device and mobile telephone of FIG. 1.
Figure 3:
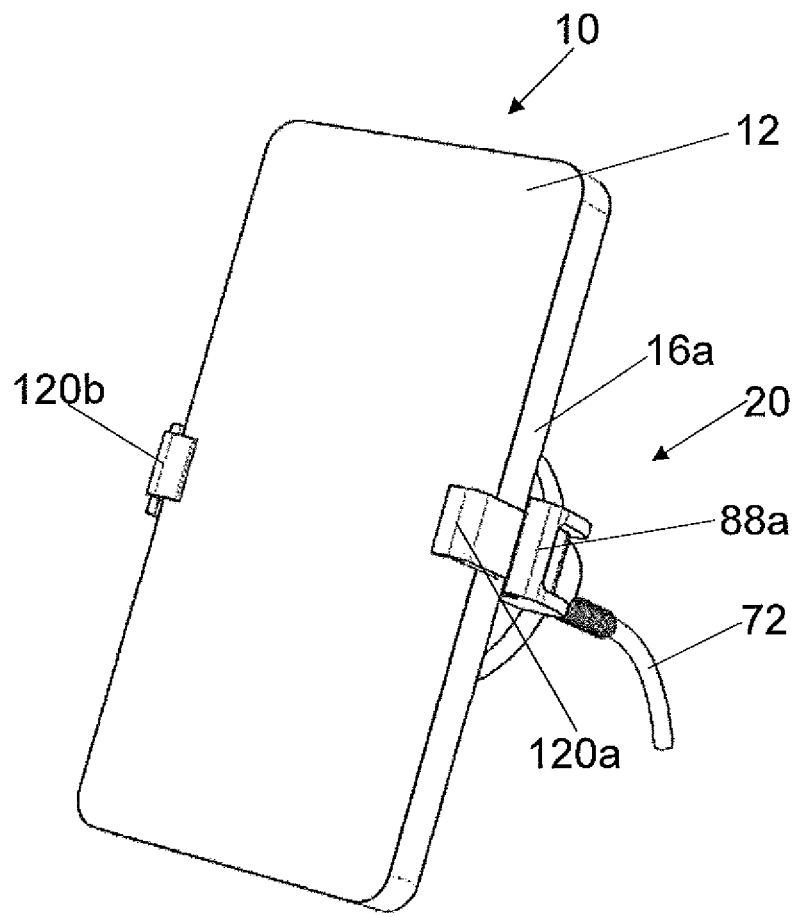
FIG. 3 is a front perspective view of the security device and mobile telephone of FIG. 1.

In FIGS. 1 to 3, the security device 20 is shown clamping a mobile telephone 10.

The mobile telephone 10 has a front surface 12, a rear surface 14 and sides 16a, 16b.

The security device 20 has a body 24, a pair of clamping elements in the form of arms 88a, 88b, a pair of lugs 118a, 118b, a cap 56 and a plug 60.

Figure 4:
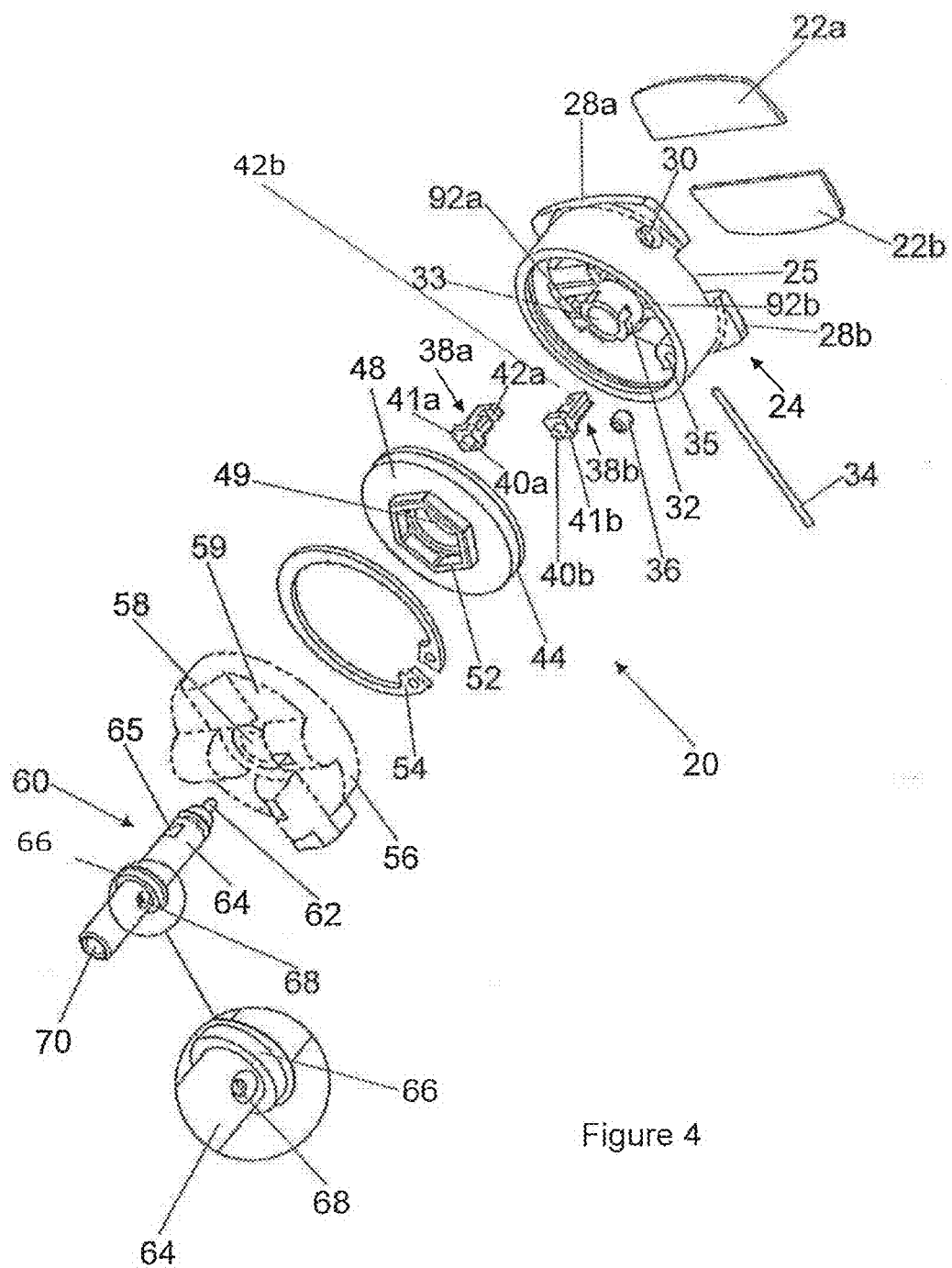
FIG. 4 is an exploded view of the security device of FIG. 1, with the clamping elements removed for clarity.

The security device 20 will now be described with particular reference to FIG. 4. The security device 20 has a pair of double-sided adhesive pads 22a, 22b, a body 24, a scroll plate 44, a circlip 54, a cap 56 and a plug 60.

The body 24 is a generally cylindrical tube having an annular housing 26 that is open at a first end and has a pair of generally rectangular plates 28a, 28b at an end opposite to the first end. The pair of generally rectangular plates 28a, 28b are separated by a groove 25. The annular housing 26 has a through hole 30 adjacent to the generally rectangular plate 28a. Within the annular housing 26 there are a pair of openings 92a, 92b that are adjacent to the groove 25 and separated by an annular socket 32. The annular socket 32 has a through-hole 33. Within the annular housing 26, there is also a mount socket 35.

The security device 26 includes a catch pin 34, a mount screw 36 and a pair of hooks 38a, 38b. Each of the pair of hooks 38a, 38b has a connector 40a, 40b extending from a base portion 41a, 41b and a hook portion 42a, 42b.

Figure 7:
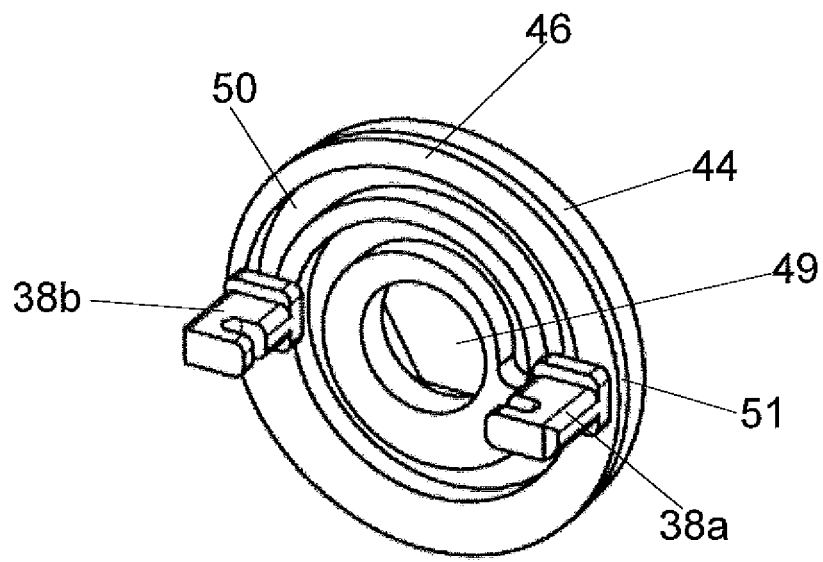
FIG. 7 is a front perspective view of the scroll plate of the security device of FIG. 1.
Figure 8:
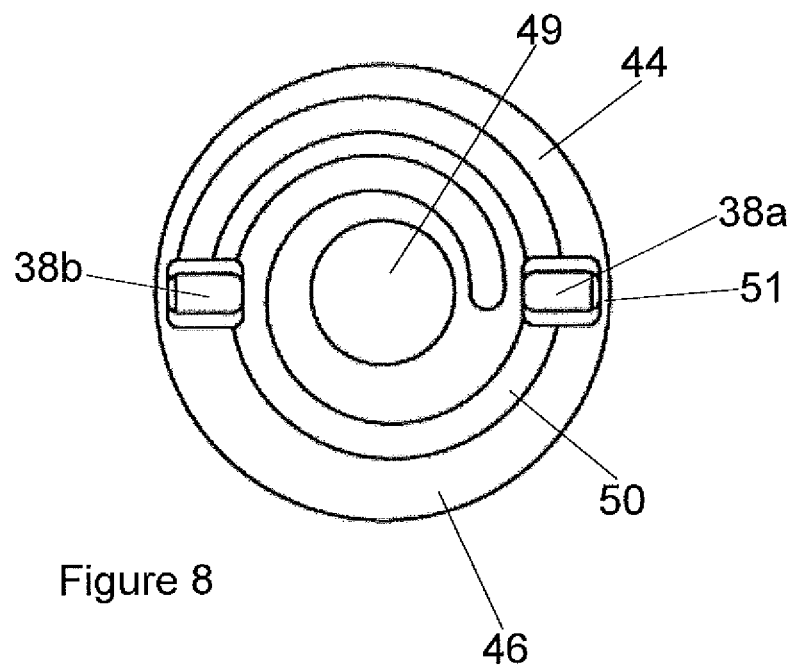
FIG. 8 is a front view of the scroll plate of FIG. 7.
Figure 9:
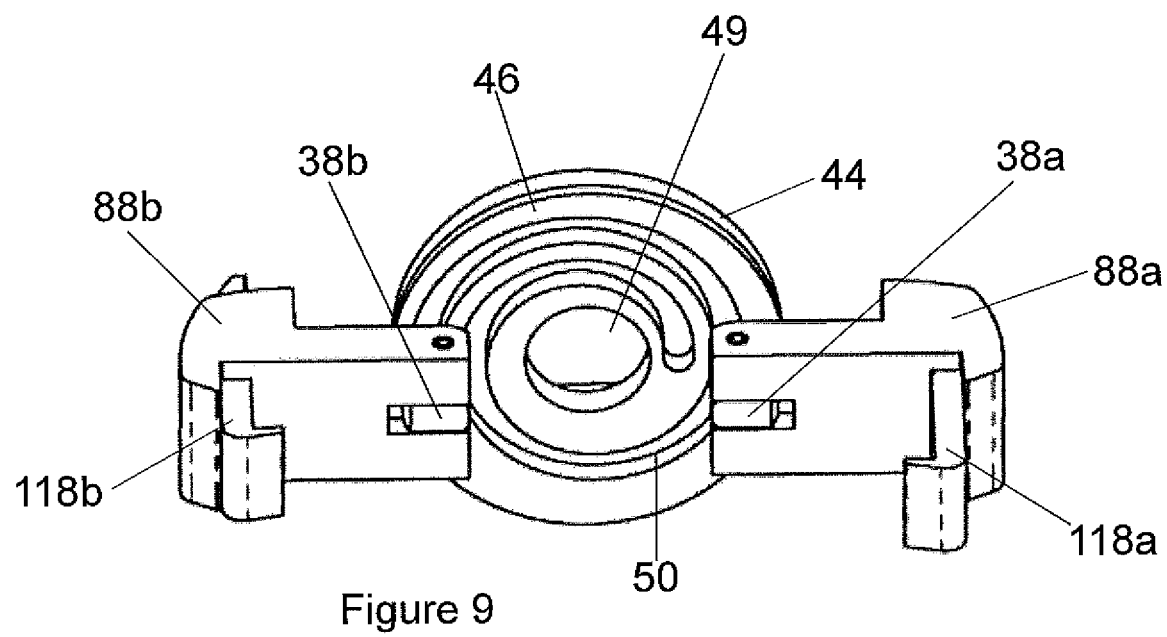
FIG. 9 is a front view of the scroll plate and clamping elements of the security device of FIG. 1.
Figure 10:
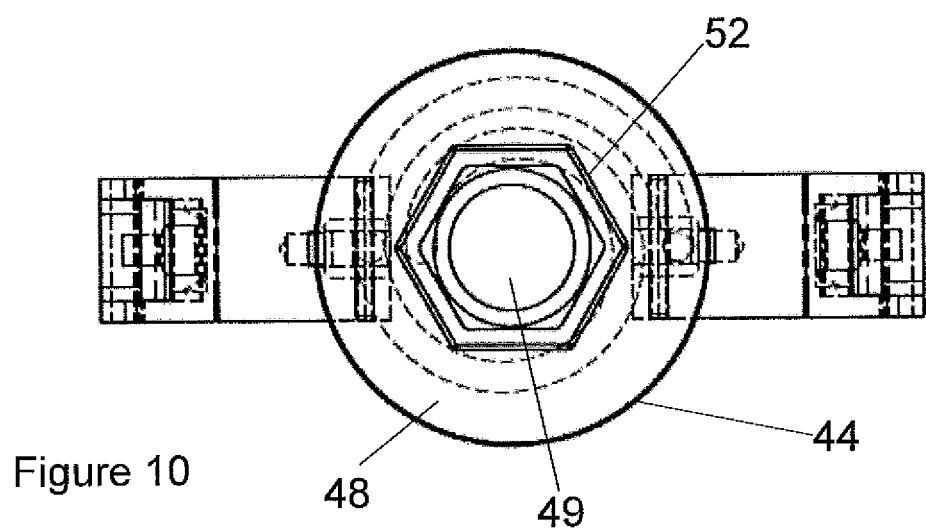
FIG. 10 is a rear view of the scroll plate and clamping elements of FIG. 9.

The scroll plate 44 is a disc having a front face 46, a back face 48 and a central aperture 49 that extends from the back face 48 to the front face 46. As shown in FIGS. 7 to 9, the front face 46 of the scroll plate 44 has a spiral groove 50 that starts adjacent to the aperture 49 and revolves around the point towards the outer wall 51 of the plate 44. The back face 48 of the plate 44 has a hex drive 52 in the form of a hexagonal wall around the periphery of the aperture 49.

The cap 56 is a generally cylindrical body having a central aperture 58 an inner face (not shown) and an outer face 59.

The plug 60 is a generally tubular structure having an outer wall 64 extending between a first end having an opening 70 and a second end that is opposite to the first end and from which a connector pin 62 extends. The outer wall 64 has a flange 66 that is positioned between the first and second ends. The outer wall 64 has a slot 65 adjacent to the second end from which the pin 62 extends. The outer wall 64 has an aperture 68 adjacent to the flange 66.

Figure 5:
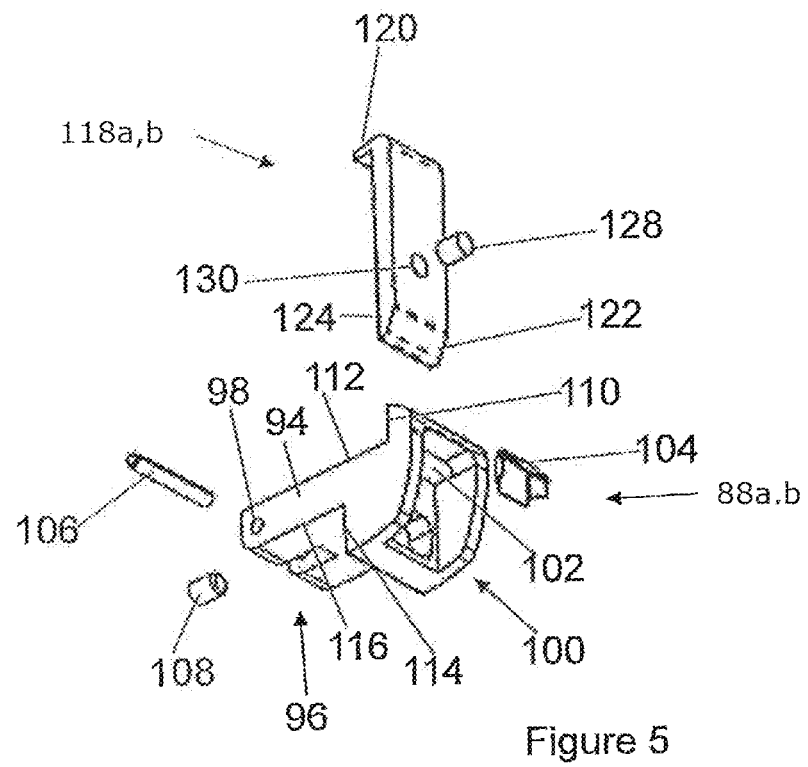
FIG. 5 is an exploded view of one of the clamping elements of the security device of FIG. 1.

The pair of arms 88a, 88b, will now be described with particular reference to FIG. 5. Each of the arms 88a, 88b has an elongate body 94 that terminates in a U-shaped portion 96. A through hole 98 extends through the U-shaped portion 96. At an end opposite to the U-shaped portion 96, each of the arms 88a, 88b has a generally rectangular portion 100 having an opening 102. The elongate body 94 has a first shoulder portion 110 on an upper surface 112 of the elongate body 94 that is offset relative to a second shoulder portion 114 on a lower surface 116 of the elongate body 94. The arms 88a, 88b each include a pawl clip 104, a spring 106 and a grub screw 108.

The pair of lugs 118a, 118b will now be described with particular reference to FIGS. 2 and 5. As shown in FIG. 5, each of the pair of lugs 118a, 118b is elongate and has a hook portion 120 at a first end and a claw 122 at a second end opposite to the first end. As shown in FIG. 2, the claw 122 has an inner surface 124 that includes a plurality ratchet teeth 126. Each lug 118a. 118b also has a connector 128 and an aperture 130.

Assembly of the security device 20 will now be described.

Hook 38a is mounted on the left side of the front face 46 of the scroll plate 44 such that the connector 40a is pushed into the groove 50 and the base portion 41a abuts the front face 46 of the scroll plate 44. Hook 38b is similarly mounted on the right side of the front face 46 of the scroll plate 44 such that the connector 40b is pushed into the groove 50 and the base portion 41b abuts the front face 46 of the scroll plate 44, as shown in FIGS. 7 and 8.

Figure 6:
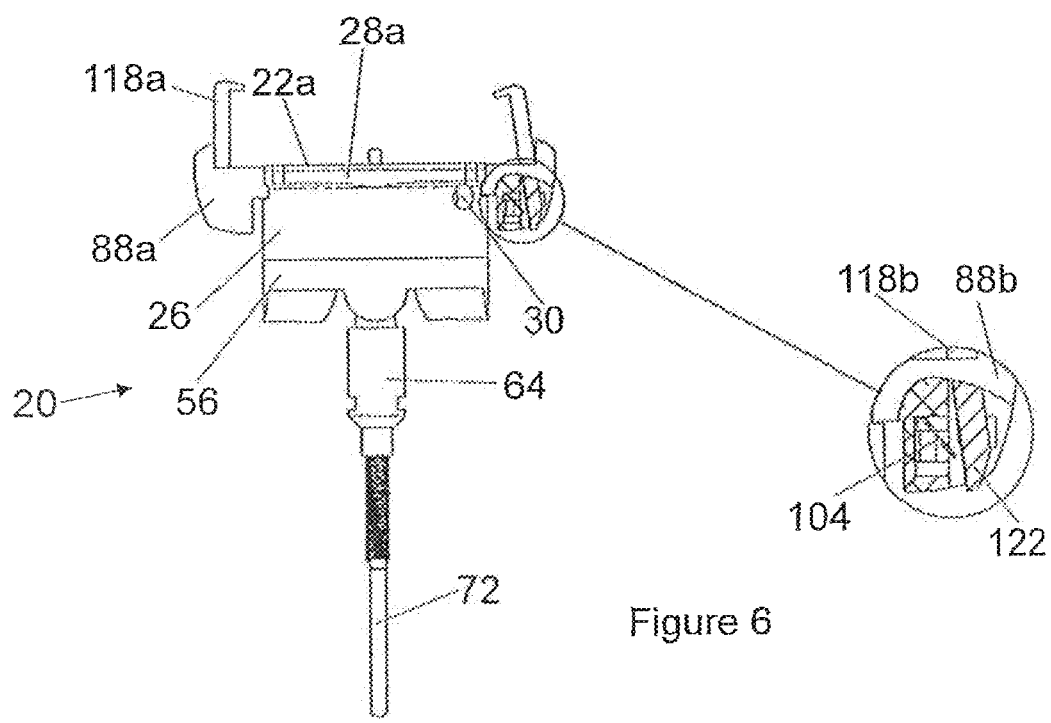
FIG. 6 is a plan view of the security device of FIG. 1, with the mobile telephone removed.

The arm 88a is assembled by passing the elongate lug 118a through the opening 102a as shown in FIG. 6. The arm 88b is similarly assembled by passing the elongate lug 118b through the opening 102b.

Double-sided adhesive pad 22a is adhered to rectangular face 28a and double-sided adhesive pad 22b is adhered to rectangular face 28b.

The scroll plate 44, to which the hooks 38a, 38b have been mounted as described above, is fitted within the annular housing, such that hook 38a extends through opening 92a and hook 38b extends through opening 92b and the annular socket 32 extends through the aperture 49 of the scroll plate.

Figure 15:
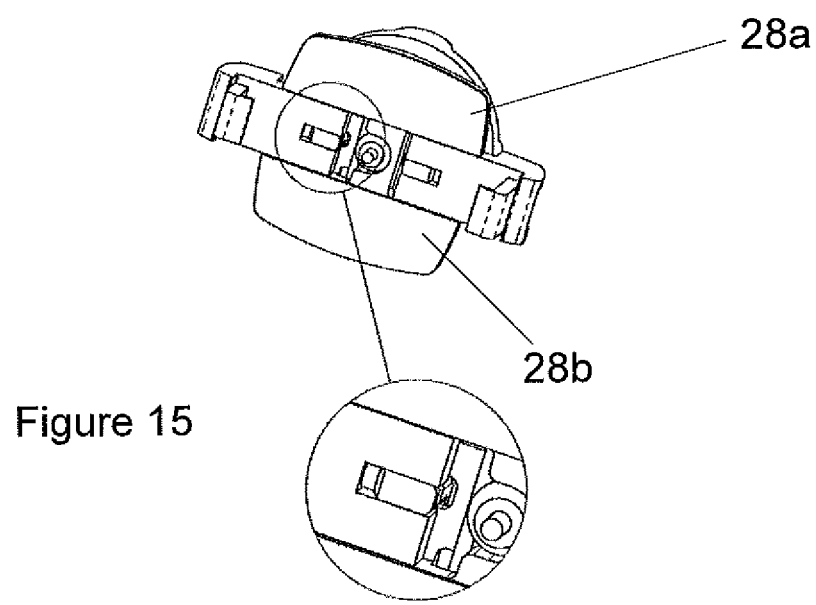
FIG. 15 is a front perspective view of the security device of FIG. 1, with the clamping elements mounted.

Arm 88a is mounted on the security device 20 by passing pin 106a through the through hole 98a of the U-shaped portion 96a and hooking the pin 106a over hook 38a. Arm 88b is similarly mounted on the security device 20 by passing pin 106b through the through hole 98b of the U-shaped portion 96b and hooking the pin 106b over hook 38b, as shown in FIG. 15.

Use of the security device 20 to secure mobile telephone 10 will now be described.

Double-sided adhesive pads 22a, 22b are pressed against the back surface 14 of the mobile telephone 10 to hold the security device 20 against the mobile telephone 10.

Rotation of the scroll plate 44 within the annular housing 26 causes the hooks 38a, 38b to move within the spiral groove 50 of the scroll plate 44. In this way, rotation of the scroll plate 44 causes linear movement of the arms 88a, 88b which are mounted on the scroll plate 44 by hooks 38a, 38b. As the scroll plate 44 is tightened, the distance between the arms 88a, 88b is reduced and as the scroll plate 44 is loosened, the distance between the arms 88a, 88b is increased.

Hook portions 120a, 120b of the lugs 118a, 118b are gently pushed against the front surface 12 of the mobile telephone 10 and pushed through the openings 102a, 102b of the arms 88a, 88b such that the ratchet teeth 126 of the lugs 118a, 118b are engaged by the pawl clips 104a, 104b of the arms 88a, 88b. As the scroll plate 44 is tightened, as described above, the arms 88a, 88b are brought together and clamp against the sides 16a, 16b of the mobile telephone 10. As the arms 88a, 88b are pushed against the mobile telephone 10, the pawl clips 104a, 104b dig into the ratchet teeth 126 of the lugs 118a, 118b.

To adjust the position of the lugs 118a, 118b, rotation of the scroll plate 44 to open the arms 88a, 88b causes the pawl clips 104a, 104b to disengage from the ratchet teeth 126, thereby enabling the lugs 118a, 118b to move freely in both directions.

Once the lugs 118a, 118b are in the desired position, the arms 88a, 88b can be closed by tightening the scroll wheel 44.

When the mobile telephone 10 is secured in the security device 20, the key 132 is removed from the scroll plate 44. Circlip 56 is mounted against the back face 48 of the scroll plate 44 and cap 56 is used to cover the back of the security device.

Figure 11:
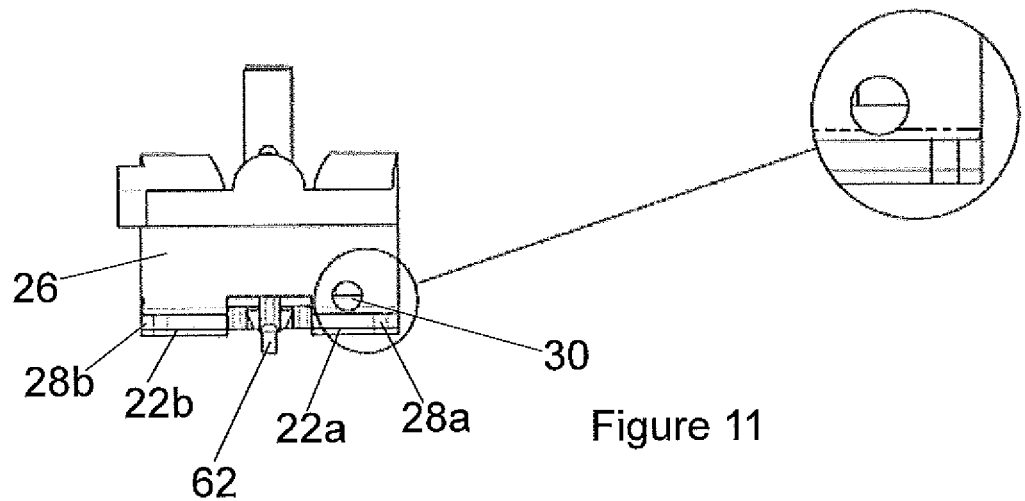
FIG. 11 is a plan view of the security device of FIG. 1, with the clamping elements removed for clarity.
Figure 12:
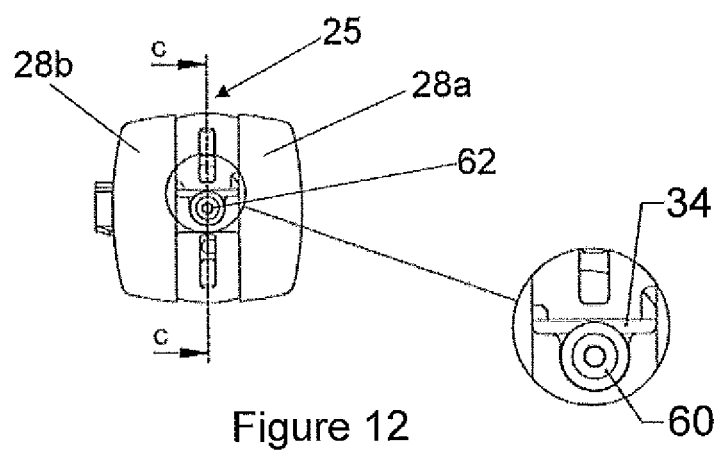
FIG. 12 is a front view of the security device of FIG. 1, with the clamping elements removed for clarity.
Figure 13:
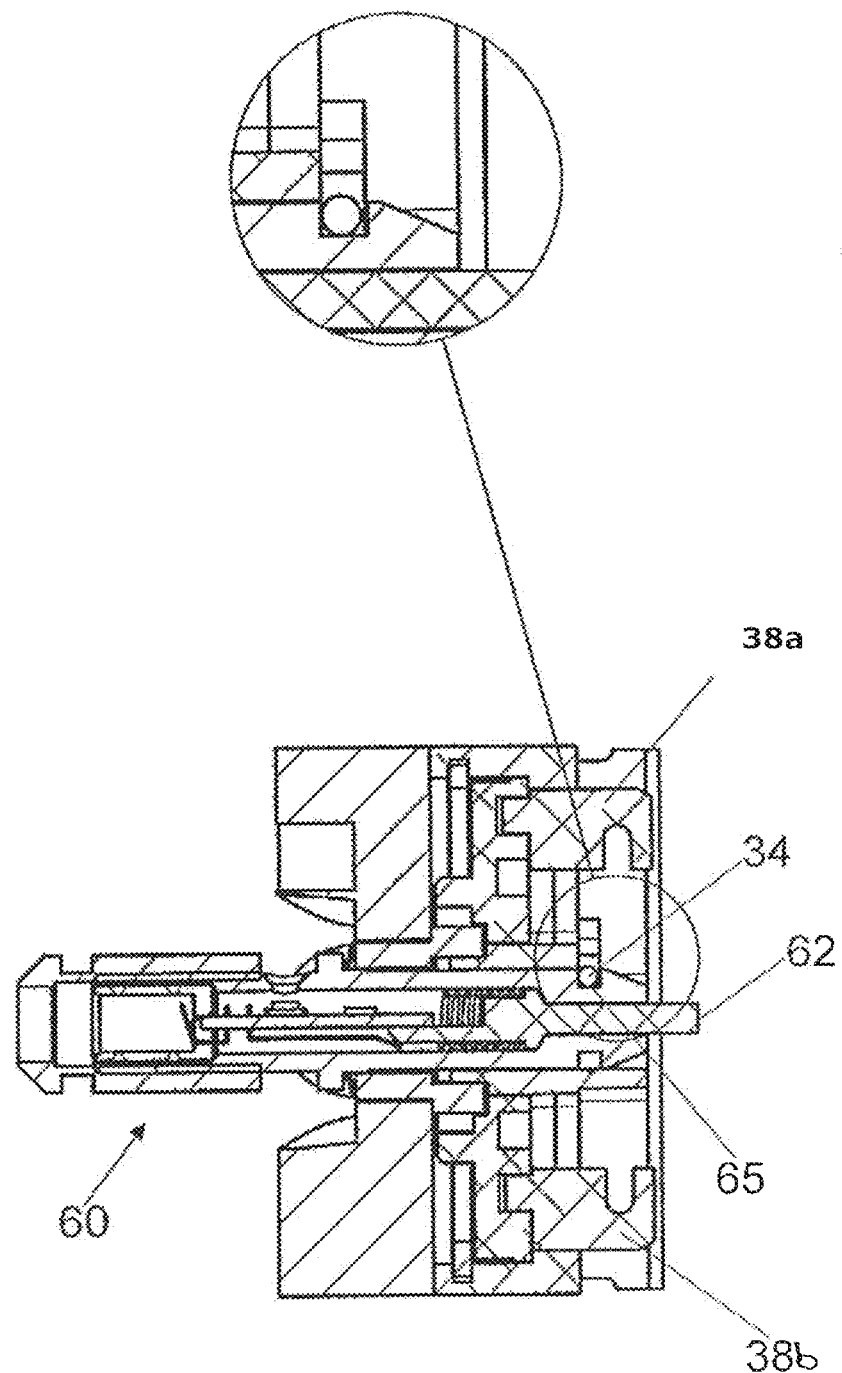
FIG. 13 is a cross section through line C-C of FIG. 12.
Figure 14:
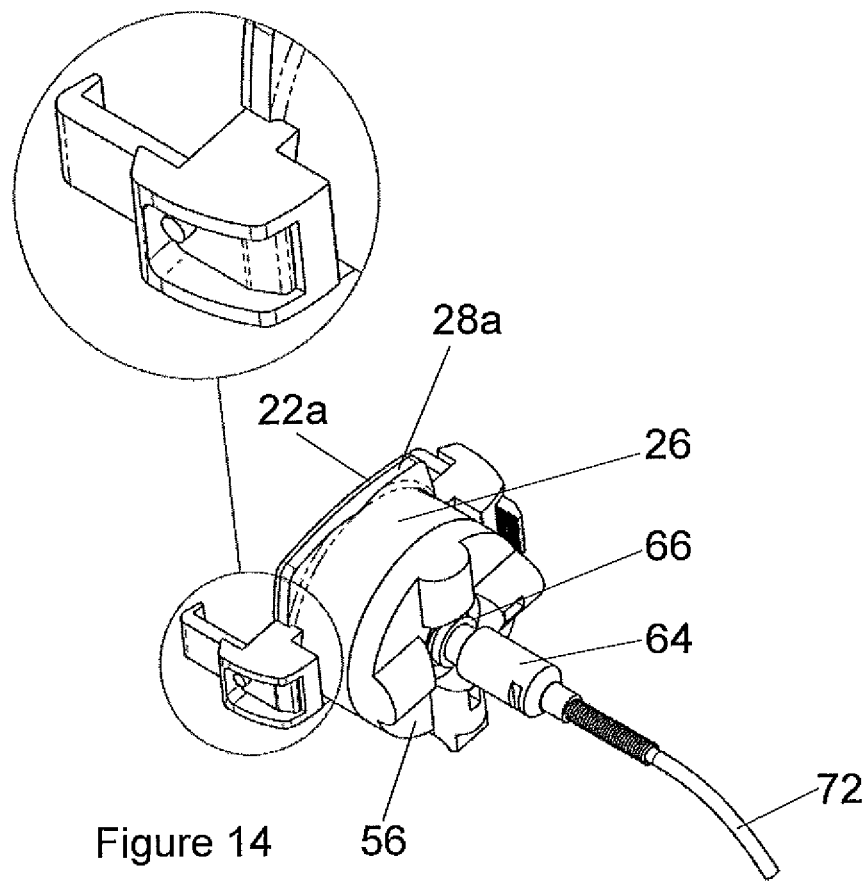
FIG. 14 is a rear perspective view of the security device of FIG. 1, with the clamping elements mounted.

Plug 60 is inserted into the aperture 58 of the cover such that the portion of the plug 60 having the groove 65 extends through the aperture 49 in the scroll plate 44 and into the annular socket 32 in the annular housing 26. Catch pin 34 is inserted into the aperture 30 and held in place with the mount screw 36 such that the catch pin 34 abuts the groove 65 in the plug and the connector pin 62 extends through the apertures to the front of the security device 20, as shown in FIGS. 11 to 13. Connector pin 62 abuts the back surface 14 of the mobile telephone 10. The flange 66 of the plug 60 abuts the outer surface 59 of the cap 56 and prevents the cap 56 being removed from the security device 20. In this way, unauthorised actuation of the scroll plate 44 and movement of the arms 88a, 88b is prevented. A grub screw (not shown) is threaded into aperture 68 in order to secure the plug 60 on the security device 20.

As shown in FIGS. 1 to 3, a cable 72 is inserted into the aperture 70 of the plug 60. This cable 72 provides a mechanical tether to a display shelf (not shown) and may additionally provide an electrical connection, for example to charge the mobile telephone 10.

Figure 16:
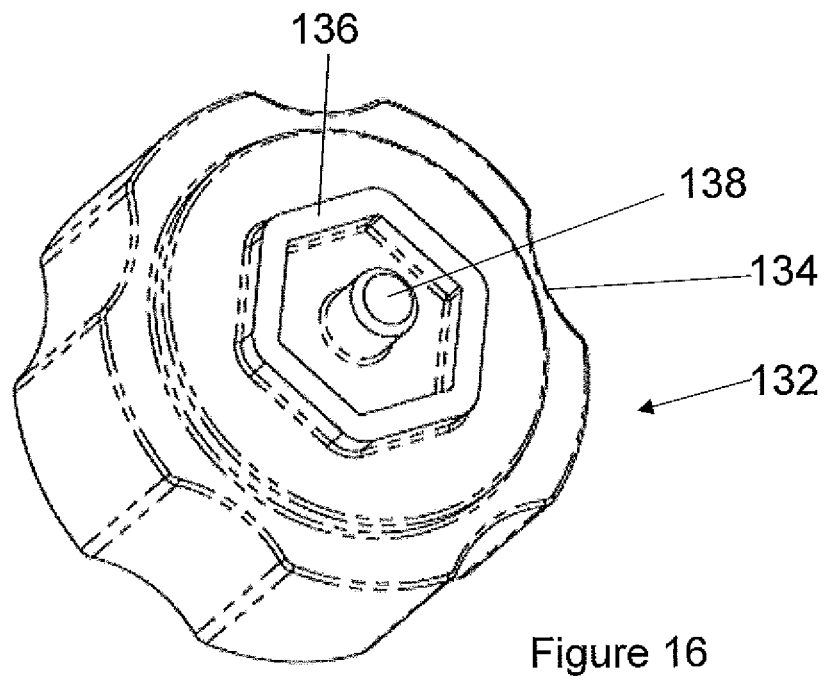
FIG. 16 is a front perspective view of a tool for use in conjunction with the security device of the first embodiment of the present invention.
Figure 17:
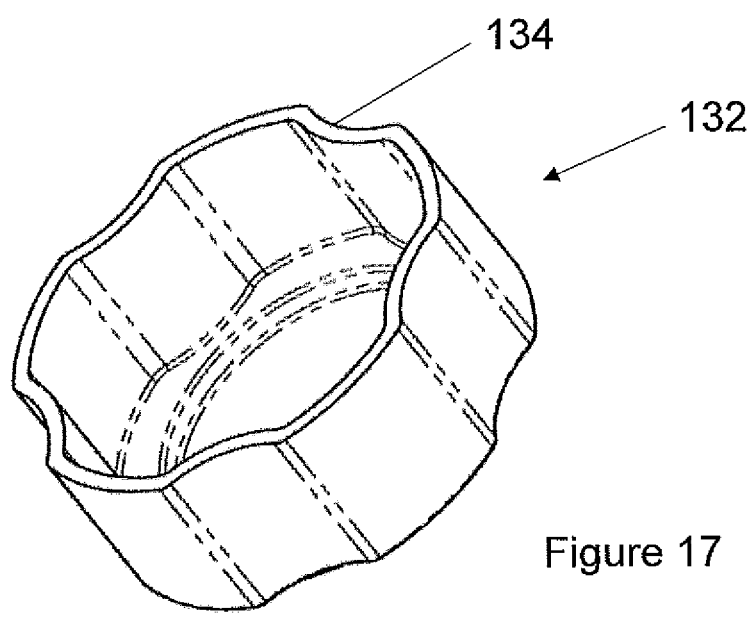
FIG. 17 is a rear perspective view of the tool of FIG. 16.

Referring now to FIGS. 16 and 17, there is shown a tool 132 for use in conjunction with the security device 20. The tool 132 has a generally cylindrical body 134, a hex drive 136 and a boss 138. The boss 138 of the key 132 fits within the annular socket 32 of the annular housing 26 and the hex drive 136 of the key 132 engages the hex drive 52 of the scroll plate 44. As the key 132 is turned, the hex drive 52 of the scroll plate 44 is turned, which causes the hooks 38a, 38b to move within the spiral groove 50 of the scroll plate 44.

Referring now to FIGS. 18 to 25, there is shown a security device 220 according to a second embodiment of the present invention. Like reference numerals depict like features, which will not be described further.

Figure 18:
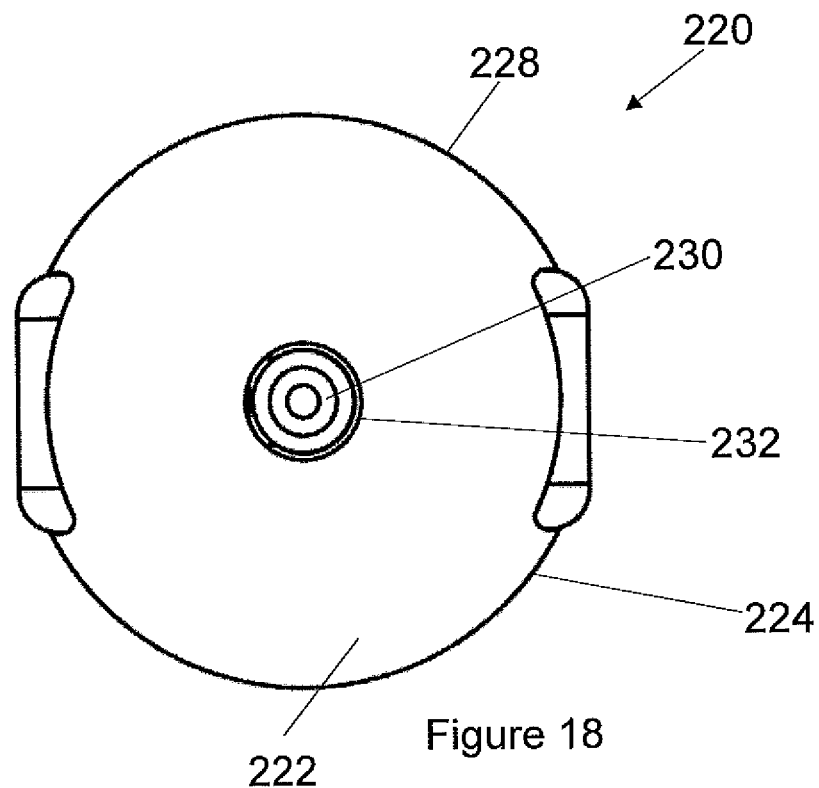
FIG. 18 is a front view of a security device according to a second embodiment of the present invention.
Figure 19:
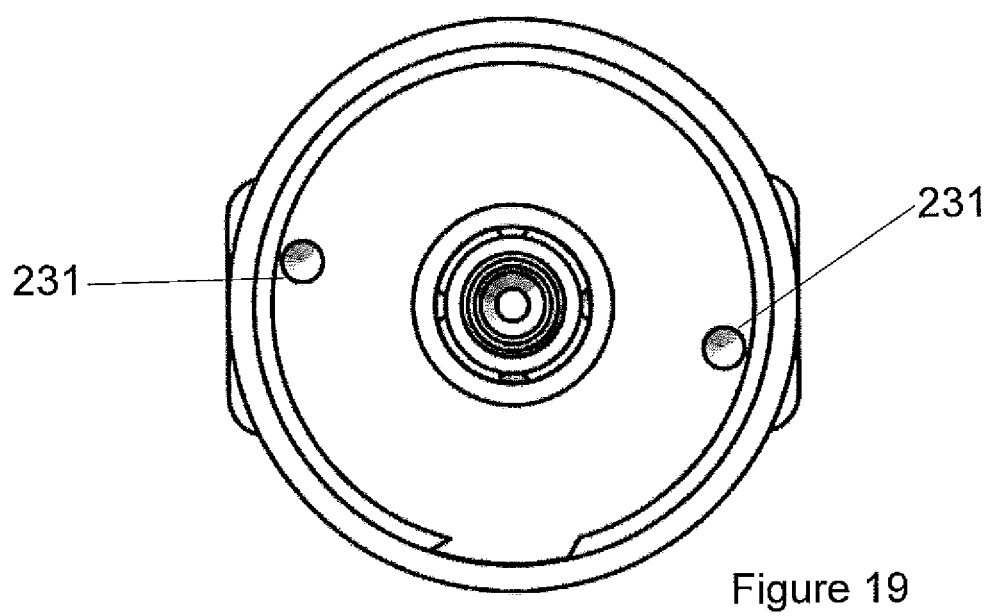
FIG. 19 is a back view of the security device of FIG. 18.
Figure 20:
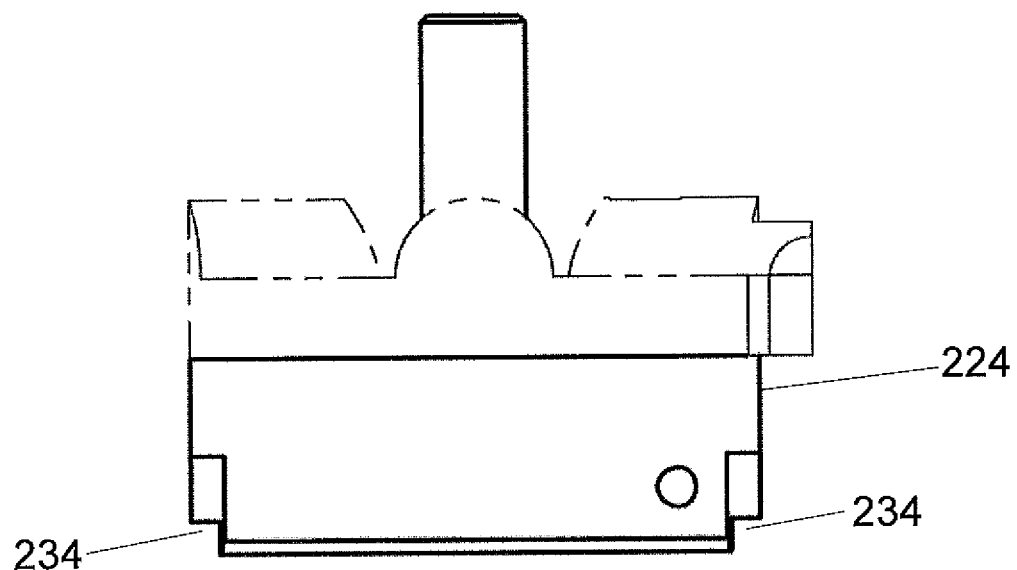
FIG. 20 is a top view of the security device of FIG. 18.
Figure 21:
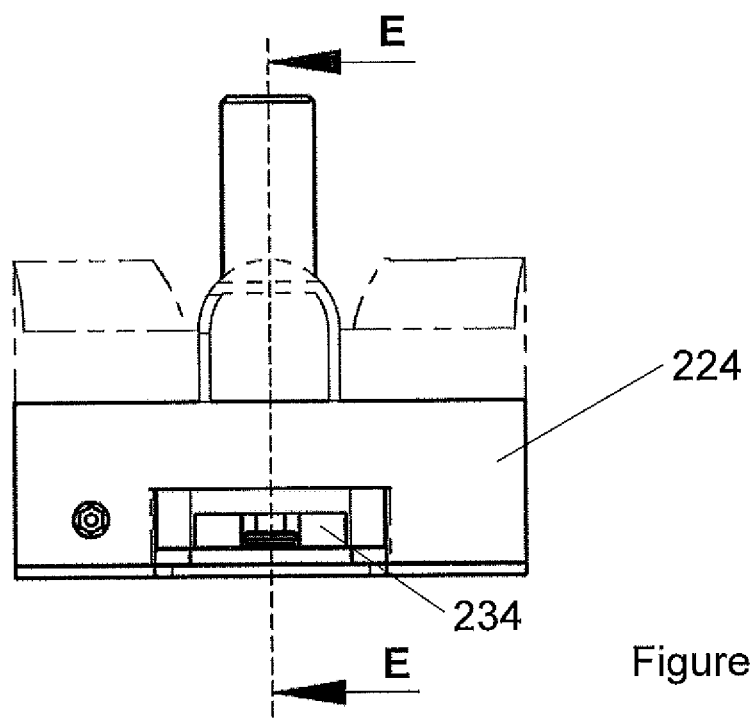
FIG. 21 is a side view of the security device of FIG. 18.
Figure 22:
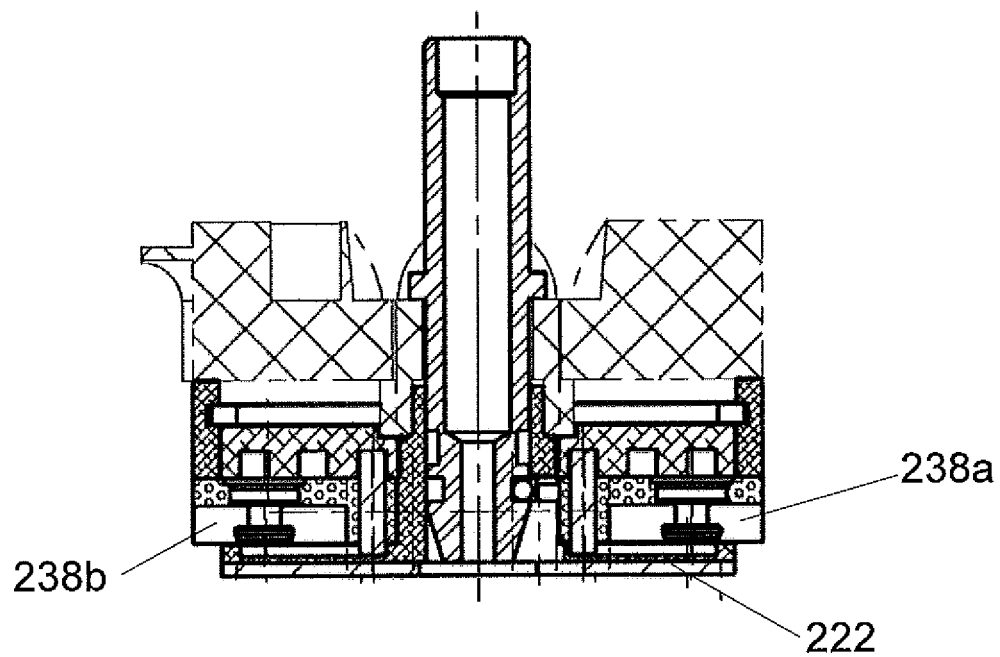
FIG. 22 is a cross section through line E-E of FIG. 21.

As shown in FIG. 18, the body 224 of the security device 220 has a single annular plate 228 that has a central annular aperture 230. A single annular adhesive pad 222 having a central aperture 232 is mounted on the annular plate 228.

The body 224 of the security device 220 has a pair of slots 234 on opposite sides. Each of the arms 88a, 88b is slotted into one of the slots 234.

Figure 23:
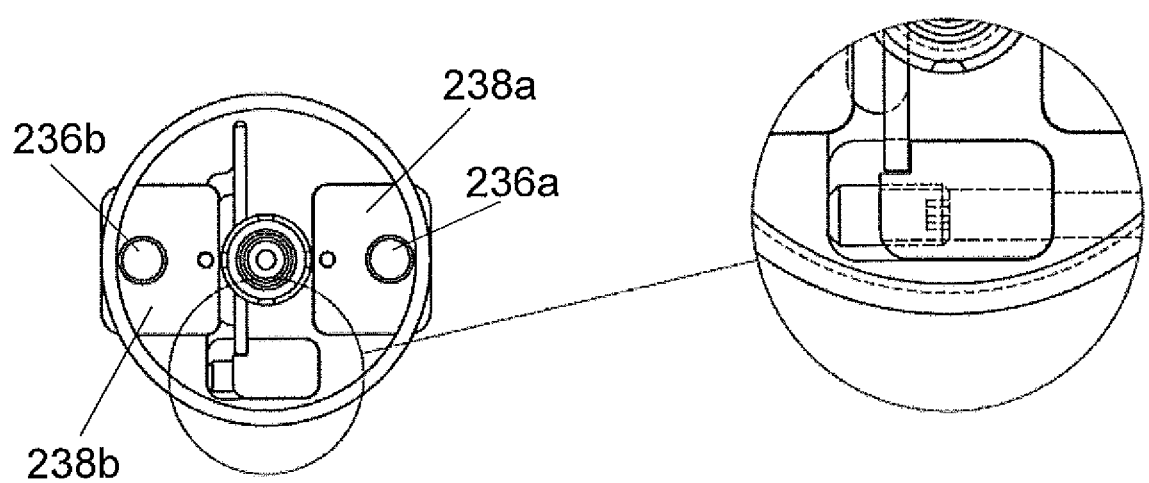
FIG. 23 is a front view of the security device of FIG. 18, with the upper surface removed.
Figure 24:
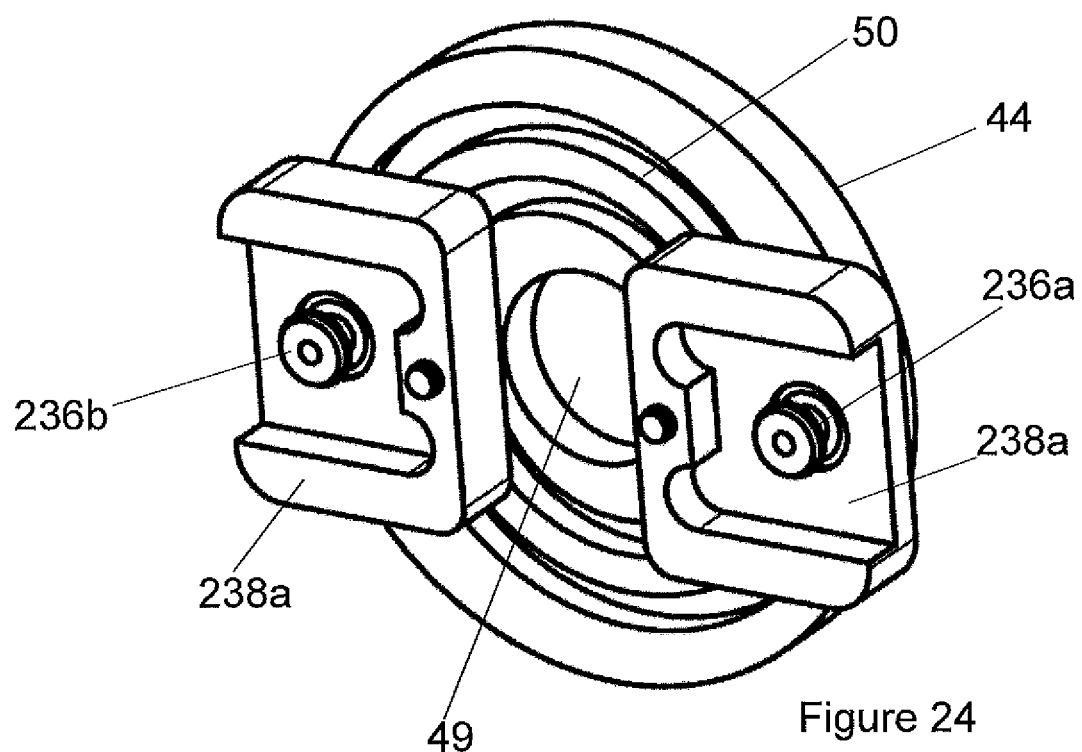
FIG. 24 is a front perspective view of the scroll plate of the security device of FIG. 18.
Figure 25:
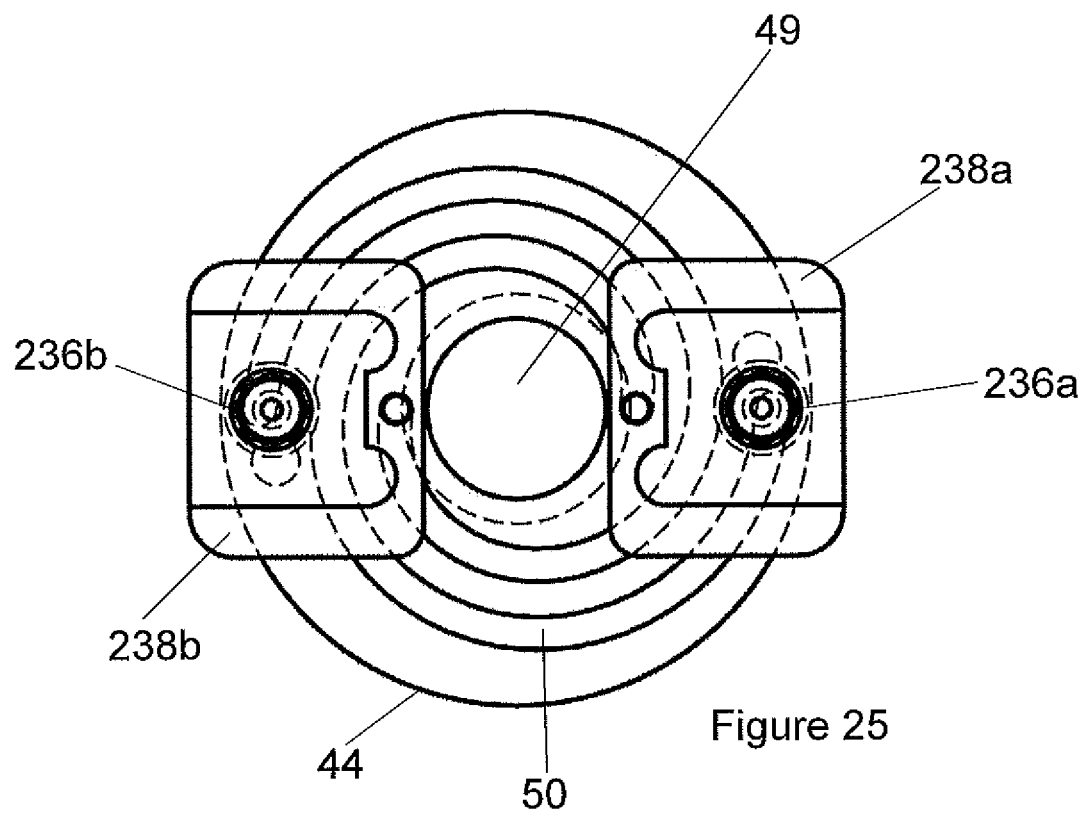
FIG. 25 is a plan view of the scroll plate of FIG. 24.

Referring now to FIGS. 23 to 25, the arms 88a, 88b connect to connectors or shoulder couplings 236a, 236b on plates 238a, 238b by a capture mechanism, for example a push fit connection, that are mounted on the scroll plate 44.

Figure 26:
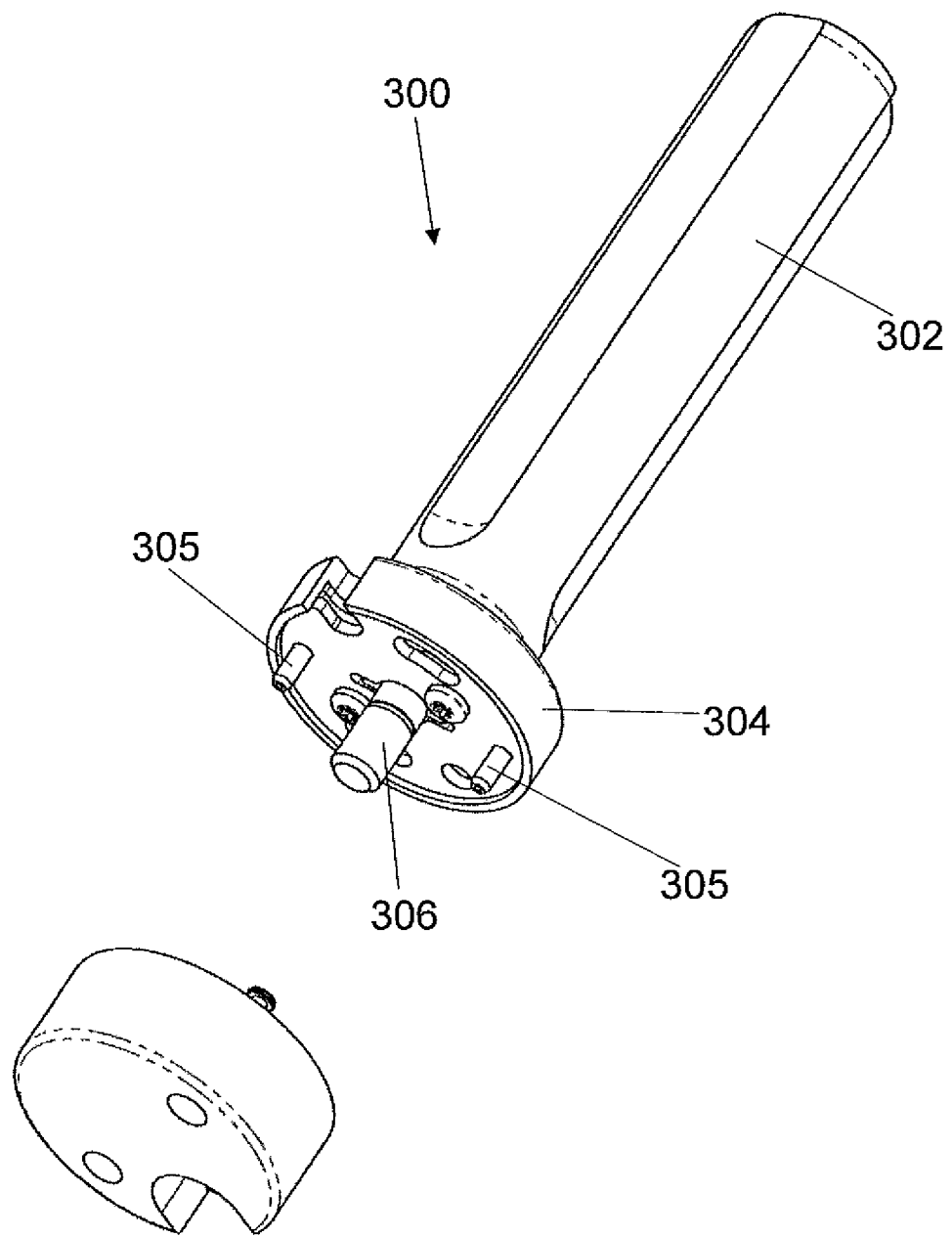
FIG. 26 is a perspective view of a tool for use in conjunction with the security device of the second embodiment of the present invention.
Figure 27:
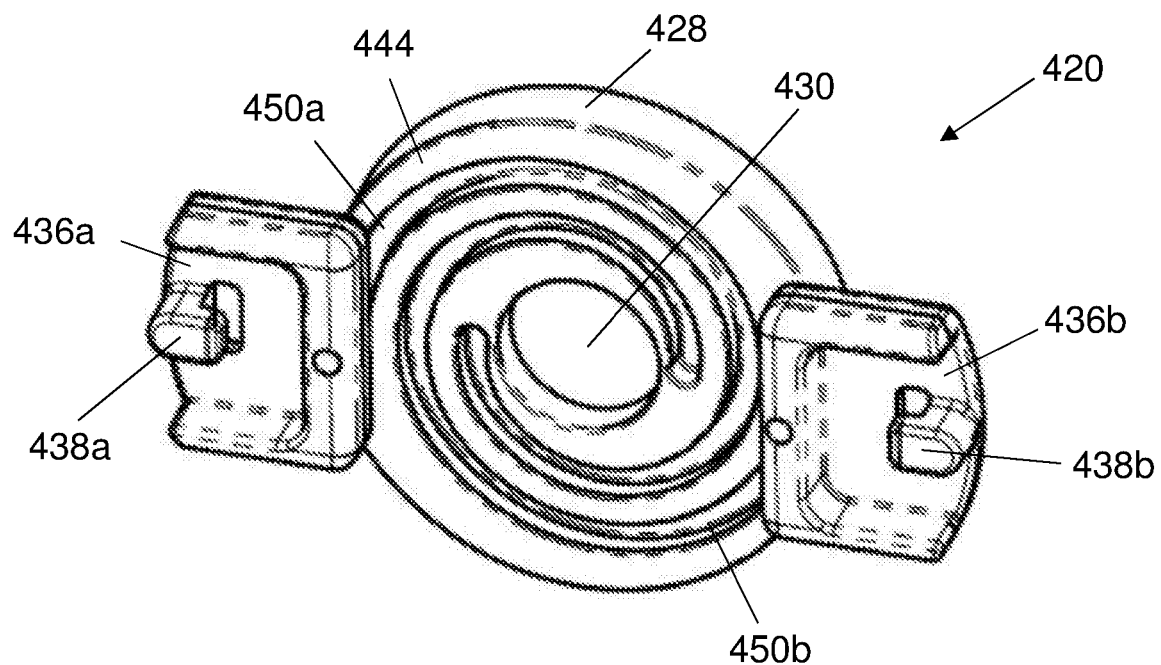
FIG. 27 is a front perspective view of a security device according to a third embodiment of the present invention.

Referring now to FIG. 26, there is shown a tool 300 for use in conjunction with the security device 220. Tool 300 has an elongate handle 302 and a head 304 that is positioned at one end of the handle 302. The head includes a pair of pins 305 that engage apertures 231 in the rear face of the body 224 and a spigot 306 that is inserted into the central aperture 49 of the scroll plate 44. Rotation of the handle 302 causes the scroll plate 44 to rotate, which in turn causes the plates 238a, 238b to move within the spiral groove 50 of the scroll plate 44.

Referring now to FIGS. 27 to 34, there is shown a security device 420 according to a third embodiment of the present invention. Like reference numerals depict like features, which will not be described further.

The security device 420 has a body 428 and connectors or shoulder couplings 436a, 436b. The body 428 has a central annular aperture 430 and a scroll plate 444. The scroll plate 444 has a pair of spiral grooves 450a, 450b.

Connector 436a is mounted on one of the spiral grooves 450a and connector 436b is mounted on the other of the spiral grooves 450b.

Figure 28:
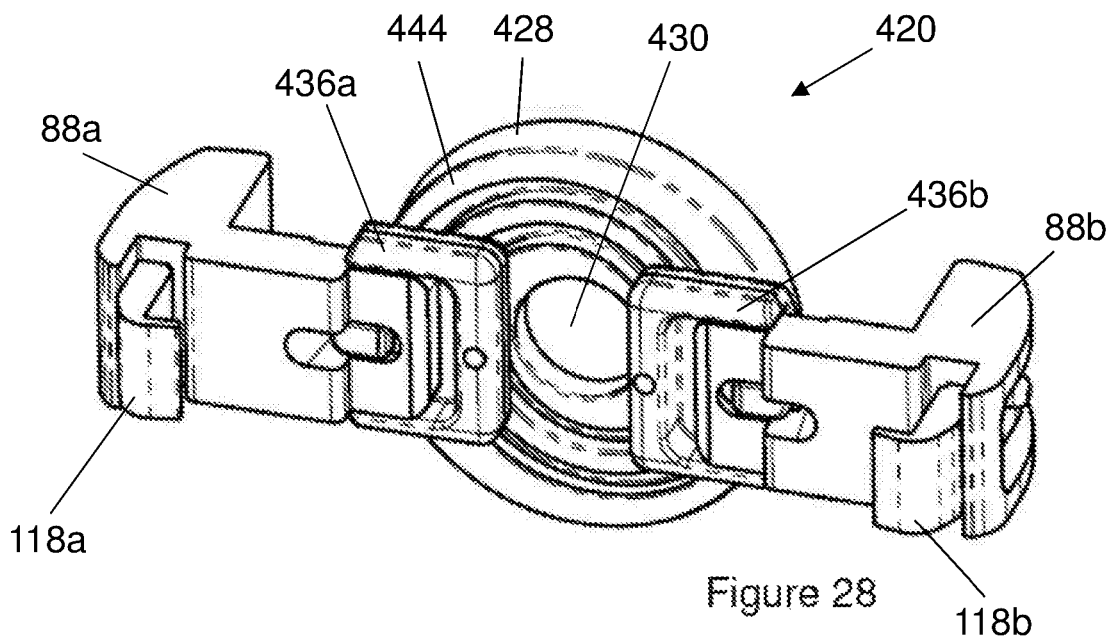
FIG. 28 is a front perspective view of the security device of FIG. 27 with arms mounted thereon.
Figure 29:
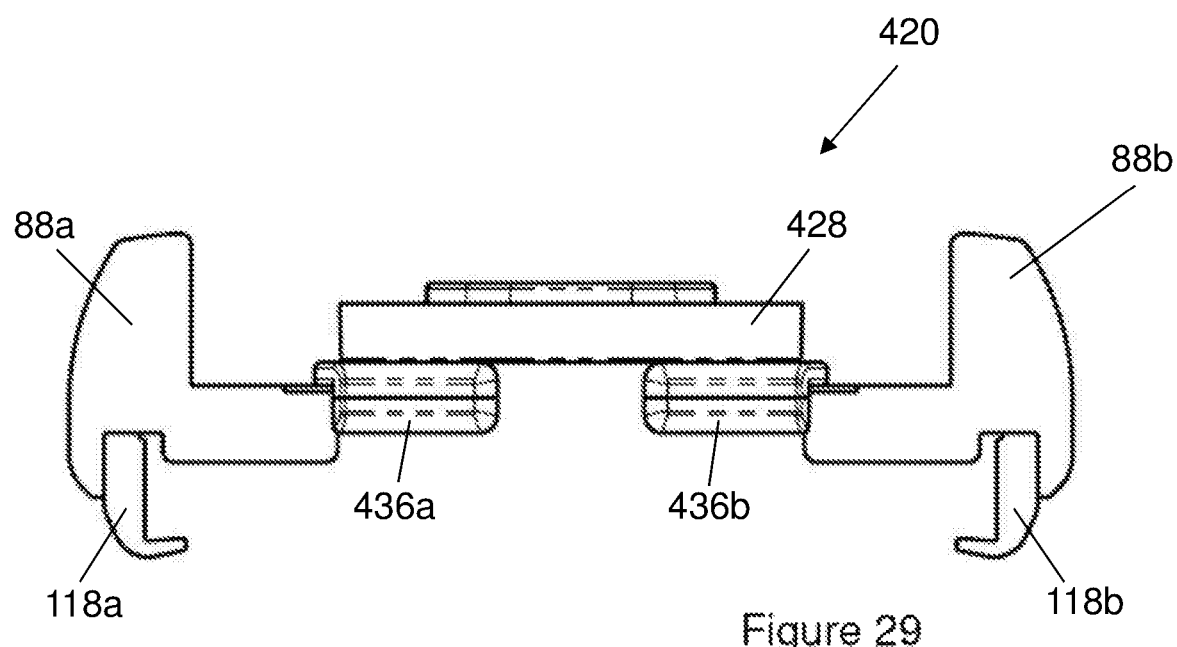
FIG. 29 is a side view of the security device of FIG. 28.
Figure 30:
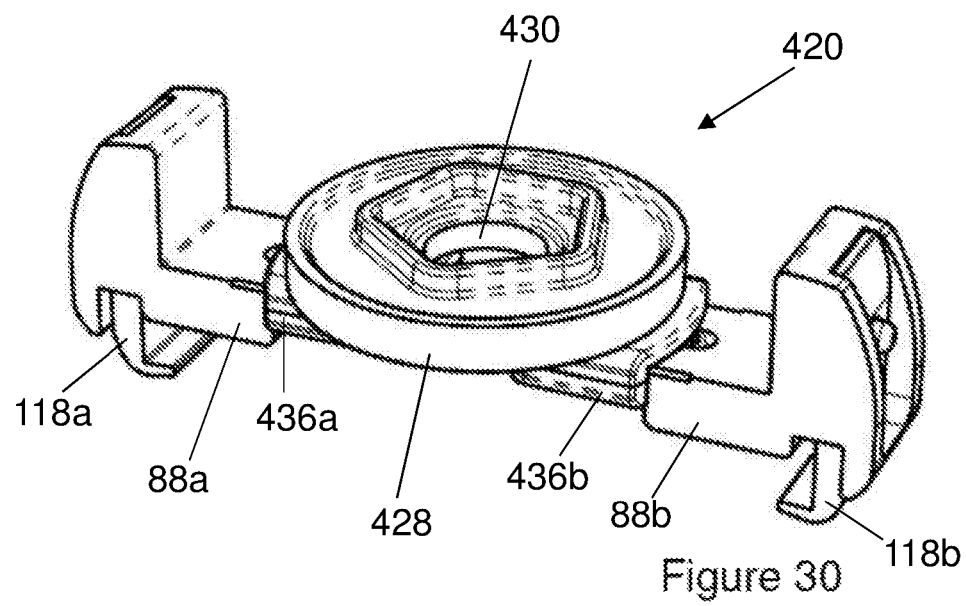
FIG. 30 is a back perspective view of the security device of FIG. 28.

Connector 436a has a hook portion 438a, on which arm 88a can be mounted, as shown in FIG. 28. Similarly, connector 436b has a hook portion 438b, on which arm 88b can be mounted, as shown in FIG. 28.

Figure 31:
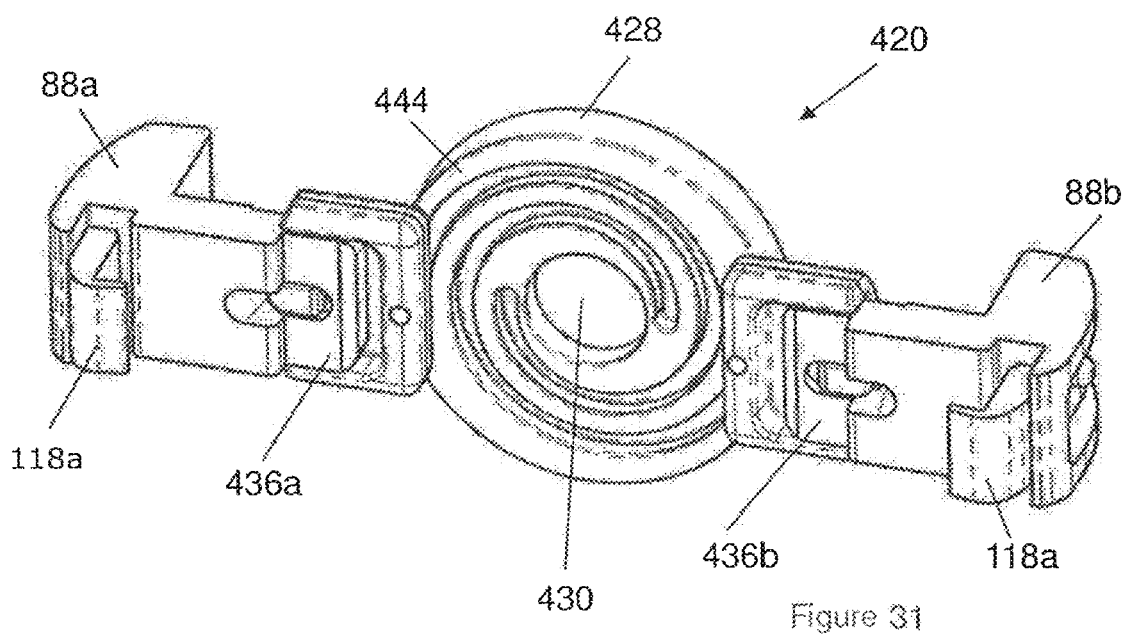
FIG. 31 is an alternative front view of the security device of FIG. 28 with the arms in an extended position.
Figure 32:
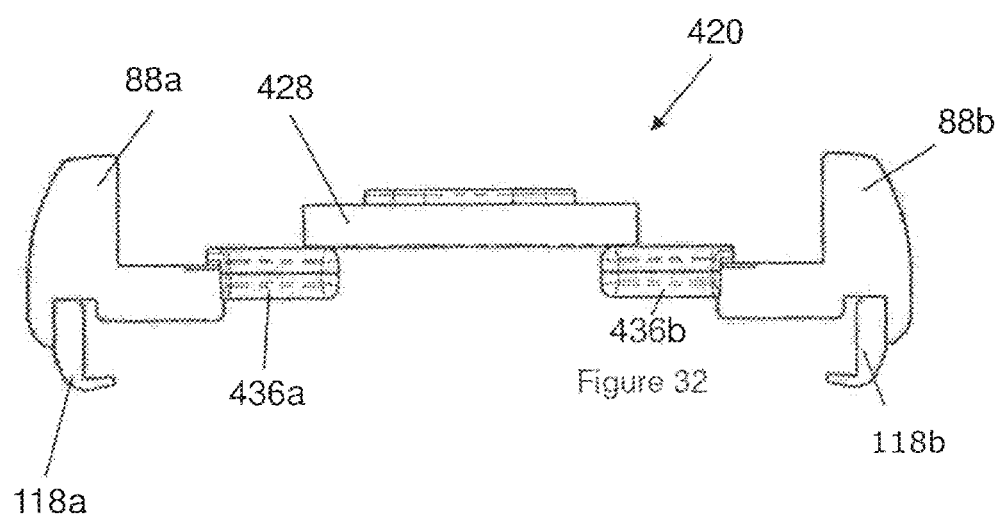
FIG. 32 is a side view of the security device of FIG. 31.
Figure 33:
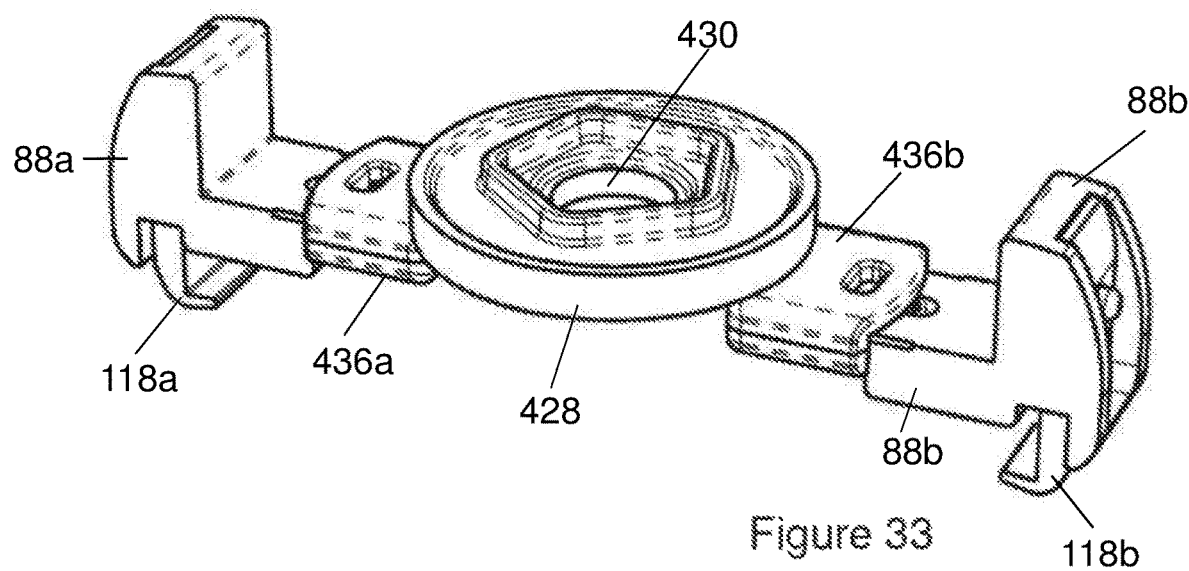
FIG. 33 is a back view of the security device of FIG. 31.
Figure 34:
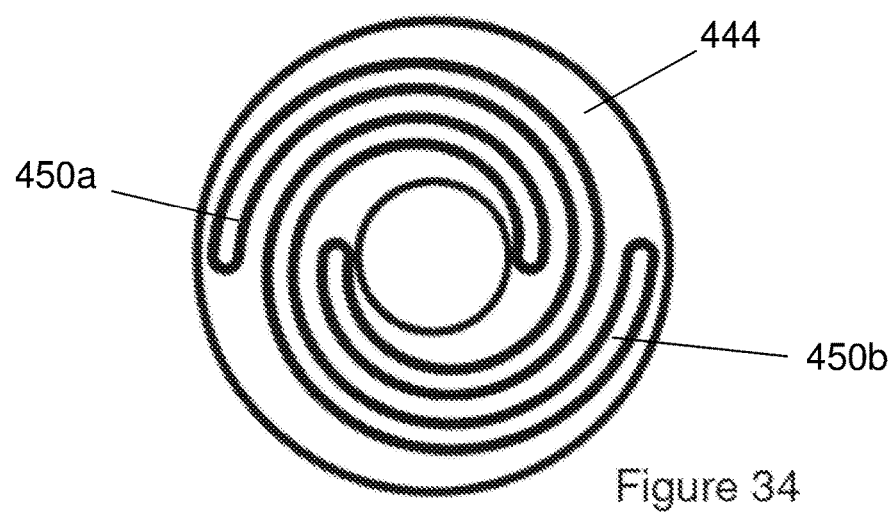
FIG. 34 is a front view of the scroll wheel of the security device of FIGS. 27 to 33.

Rotation of the scroll plate 444 within the annular housing 26 causes connector 436a to move within spiral groove 450a of the scroll plate 444 and connector 436b to move within spiral groove 450b. In this way, rotation of the scroll plate 444 causes linear movement of the arms 88a, 88b which are mounted on the scroll plate 444. As the scroll plate 444 is tightened, the distance between the arms 88a, 88b is reduced (as shown in FIGS. 27 to 30) and as the scroll plate 444 is loosened, the distance between the arms 88a, 88b is increased (as shown in FIGS. 31 to 33).

Variations of the above embodiments fall within the scope of the present invention.

The security device may include more than two clamping elements, for example the security device may include three or four clamping elements.

In the embodiments described above, catch pin 34 is inserted into the aperture 30 and held in place with a mount screw 36 such that the catch pin 34 abuts the groove 65 in the plug. In alternative embodiments the invention, the catch pin 34 may be seated in a tight fitting groove such that the groove in the plug holds the catch pin in position.

In the embodiments described above the back face 48 of the scroll plate 44 has a hex drive 52. It will be understood that in alternative embodiments the drive may be in the form of any polygon.

In the embodiments described above, a grub screw is threaded into aperture 68 in order to secure the plug 60 on the security device 20. It will be understood that in alternative embodiments, the pin 34 may be seated in a tight fitting groove.

The invention claimed is:

1. A security device for holding a phone, camera, tablet, smart watch or other valuable item so that it can be viewed and used by a person, but not readily removed from the security device, the security device comprising:
   at least two clamping elements to clamp an item on two sides, and
   clamping means to draw the at least two clamping elements together to clamp the item, wherein the clamping means includes a scroll plate,
   wherein the clamping means to draw the at least two clamping elements together to clamp the item is operated by a tool.

2. The security device according to claim 1, wherein each of the at least two clamping elements includes a lug to overlap the front of the item to prevent the item being pulled away from the device.

3. The security device according to claim 2, wherein the position of each lug is adjustable with respect to the clamping element on which it is mounted, and includes a one way mechanism, such that the lug can be moved to engage the front face of a valuable item, and cannot be moved back away from that position.

4. The security device according to claim 3, wherein the one way mechanism on each of the at least two clamping elements includes a pawl to engage a ratchet.

5. The security device according to claim 1, wherein the scroll plate includes means defining a spiral groove and each of the at least two clamping elements includes a connector received in the groove such that rotational movement of the scroll plate results in linear movement of the at least two clamping elements in the radial direction with respect to the groove.

6. The security device according to claim 5, wherein each of the at least two clamping elements is detachably attached to the scroll plate.

7. A security device for holding a phone, camera, tablet, smart watch or other valuable item so that it can be viewed and used by a person, but not readily removed from the security device, the security device comprising:
   at least two clamping elements to clamp an item on two sides, and
   clamping means to draw the at least two clamping elements together to clamp the item,
   further comprising a plug for connection to a secure fixing, wherein the plug comprises a connector pin to provide a contact to the valuable item.

8. The security device according to claim 7, wherein the plug is a non-return push connector.

9. The security device according to claim 7, wherein the plug comprises a collar and cable to tether the security device to a secure fixing.

10. A security device for holding a phone, camera, tablet, smart watch or other valuable item so that it can be viewed and used by a person, but not readily removed from the security device, the security device comprising:
   at least two clamping elements to clamp an item on two sides, and
   clamping means to draw the at least two clamping elements together to clamp the item, wherein the clamping means includes a scroll plate;
   wherein
      each of the at least two clamping elements includes a lug to overlap the front of the item to prevent the item being pulled away from the device,
      the position of each lug is adjustable with respect to the clamping element on which it is mounted, and includes a one way mechanism, such that the lug can be moved to engage the front face of a valuable item, and cannot be moved back away from that position, and the one way mechanism on each of the at least two clamping elements includes a pawl to engage a ratchet.

* * * * *